United States Patent Office 3,772,290
Patented Nov. 13, 1973

3,772,290
METHOD OF PRODUCING THIAZOLOPYRIMIDINES BY REACTION OF 6-AMINO-1,3-DIMETHYLURACIL WITH ALKYL ISOTHIOCYANATE
Arthur Berger, Skokie, Ill., and Edeltraut E. Borgaes, Sindelfingen, Germany, assignors to Baxter Laboratories, Inc., Morton Grove, Ill.
No Drawing. Original application Apr. 13, 1969, Ser. No. 849,899, now abandoned. Divided and this application Nov. 18, 1971, Ser. No. 200,208
Int. Cl. C07d 99/10
U.S. Cl. 260—256.5 R      1 Claim

ABSTRACT OF THE DISCLOSURE

The method of making thiazolopyrimidines by reaction of 6-amino-1,3-dimethyluracil with alkyl isothiocyanate and dimethylsulfoxide at reflux temperature.

---

This is a divisional of application Ser. No. 849,899, filed Apr. 13, 1969, now abandoned.

The present invention relates to novel organic thiazolopyrimidines. More particularly, this invention relates to ring substituted thiazolopyrimidines having the general formula:

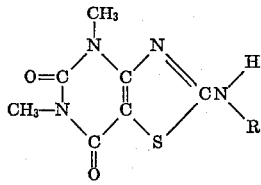

wherein R is selected from the group consisting of lower alkyl having from 1 to about 4 carbon atoms and allyl.

The compounds of the present invention have been found to have potent central nervous system anti-depressant activity in animals. The ability of these compounds to revive animals given large doses of barbiturates has been shown in mice and dogs. As such, the compounds of the present invention are useful agents for these and other animals as narcotic, barbiturate and anesthetic antagonists and as psychomotor and respiratory stimulants. These compounds are new compounds which have not been described heretofore in the literature and have unique barbiturate antagonist properties. Certain analogs of the present compounds which contain hydrogens instead of methyl groups on the ring nitrogens of the uracil moiety have been described heretofore in British Pat. 713,652 as having antimicrobial properties, and certain other analogs which contain carboxylic acid groups instead of amino groups on the ring carbon of the thiazolo moiety have been described heretofore in U.S. Pat. 3,155,665 as having hypotensive, diuretic and anti-inflammatory properties. However, these analogs are not known to have central nervous system anti-depressant activity.

The synthesis of the novel thiazolopyrimidines of the present invention can be carried out by any of several methods:

(1) By reacting 6-amino-1,3-dimethyluracil with an appropriate isothiocyanate, employing dimethylsulfoxide as an oxidizing agent at its reflux temperature, as follows:

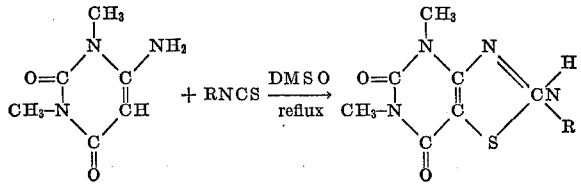

(2) By reacting uracil thioureas with bromine as follows:

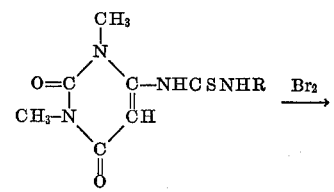

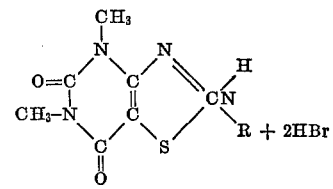

(3) By reacting uracil thioureas with hydrogen peroxide as follows:

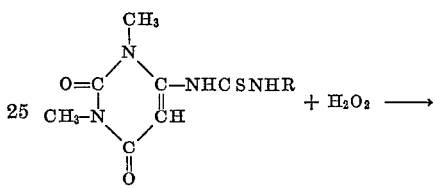

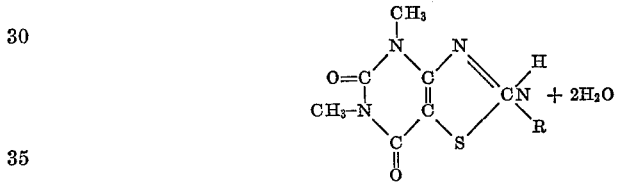

wherein R in each of the above methods is as previously defined.

The synthesis of the uracil thioureas used as starting materials for the preparation of the novel thiazolopyrimidines of the present invention can be effected by reacting 6-aminio-1,3-dimethyluracil with an appropriate isothiocyanate. This synthesis is facilitated by reaction in the presence of a mutual solvent such as an amide, for example, dimethylformamide at reflux temperature, or a sulfoxide, for example, dimethylsulfoxide at a temperature not above about 150° C.

The general reaction can be described by the following equation:

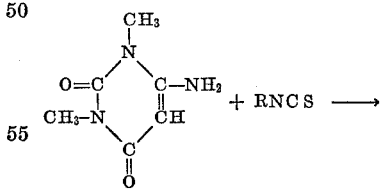

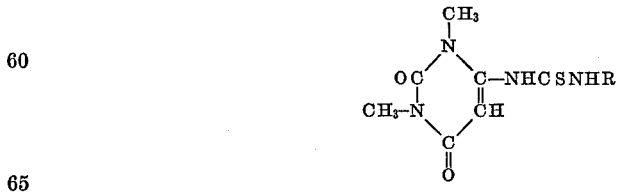

wherein R is as previously defined.

Illustrative of the isothiocyanates which can be used in the above reaction are the methyl, ethyl, propyl, butyl and allyl isothiocyanates and the like.

The isothiocyanate reagents are generally available commercially or can be made by conventional procedures, for example, by reaction of an amine, $CS_2$ and NaOH as described in "Organic Syntheses," Coll. Vol. III, p. 599 (1955), John Wiley & Sons, Inc., New York and London.

The compound 6-amino-1,3-dimethyluracil also is generally available commercially or can be made by conventional procedures, for example, by reaction of 1,3-dimethylurea with ethyl cyanoacetate as described by Traube, Ann., vol. 432, p. 281 (1923).

The preferred method of making the novel thiazolopyrimidines of the present invention is method 3, above, which provides a convenient and rapid synthetic route to these compounds. Method 1 is advantageous insofar as it does not require isolation of the intermediate thiourea used as starting material in methods 2 and 3, but the purification of the final product in method 1 is more difficult than in methods 2 and 3. Method 2 is disadvantageous compared to methods 1 and 3 when R is allyl due to bromine addition at the double bond.

Although specific methods of preparation of the novel thiazolopyrimidines of the present invention are described herein, it will be understood that these compounds are not limited to these specific methods of preparation. For example, an alternative method of preparation consists of methylating the ring unsubstituted uracil moiety. Other methods of preparation of these compounds can be devised by those skilled in the art.

The novel compounds of the present invention have been administered both intravenously (i.v.) and intraperitoneally (i.p.) in suspensions of pectin and gum acacia solutions and in alcohol-water solutions. These routes of administration as well as the oral route of administration can be used. Other methods of administration will be apparent to those skilled in the art.

Effective barbiturate antagonist dosages can range from about one to 1,000 mg. per kg. of body weight and can take the form of tablets, powders, capsules, elixirs and the like dosage forms in admixture with common solid and liquid diluents, carriers and adjuvants such as, for example, cornstarch, lactose, talc, stearic acid, magnesium stearate, gelatin, acacia and locust bean gums, alcohol, water, vegetable oils and the like materials. Other effective dosages of the novel compounds can be determined by reference to the specific examples set forth hereinafter. It has been unexpectedly found that high dosages of these compounds lose their toxicity in the presence of the active barbiturates and thus appear to be less toxic in the presence than in the absence of barbiturates.

The following examples will further illustrate the present invention although the invention is not limited to these specific examples. All percentages and parts herein are on a weight basis unless otherwise specified.

EXAMPLE I

Dimethylsulfoxide method for synthesis of 4,6-dimethyl-2-n-propylaminothiazolo-[4,5-d]-pyrimidine-5,7-dione A mixture of 3.1 grams (0.02 mole) of 6-amino-1,3-dimethyl uracil, 2.5 grams (an excess) of n-propyl isothiocyanate and 40 ml. of dimethylsulfoxide was heated under reflux for 16 hours. The reaction mixture was poured into crushed ice with stirring and the precipitate which formed was collected on a filter. The precipitate was dissolved in dimethylformamide, carbon treated for adsorption of impurities, then precipitated with water. A light brown product resulted which after drying weighed 1.7 gram (33.5% of the theoretical). It has M.P. 121–3° C.; analysis and spectral measurement established it as 4,6 - dimethyl - 2 - n - propylaminothiazolo - [4,5 - d]-pyrimidine-5,7-dione.

EXAMPLE II

Dimethylsulfoxide method for synthesis of 4,6-dimethyl-2-methylaminothiazolo-[4,5-d]-pyrimidine-5,7-dione A mixture of 31.0 grams (0.2 mole) of 6-amino-1,3-dimethyluracil, 20.0 grams (an excess) of methyl isothiocyanate and 400 ml. of dimethylsulfoxide was heated under reflux for 16 hours. The mixture was allowed to cool to about 50° C., then it was poured into crushed ice. The precipitate which formed was collected and recrystallized from n-butanol with carbon treatment. After drying there was obtained 27.8 grams (corresponding to 61.5% of the theoretical) of yellow needles of 4,6-dimethyl-2-methylaminothiazolo - [4,5-d] - pyrimidine-5,7-dione.

Other thiazolopyrimidines were also synthesized by the above procedures. Using 0.1–0.2 mole of amine, yields approximating 60% were usually obtained.

EXAMPLE III

Bromine method for synthesis of 4,6-dimethyl-2-ethylaminothiazolo-[4,5-d]-pyrimidine-5,7-dione To 12.1 grams (0.05 mole) of 1-(2,4-diketo-1,3-dimethyl-1,2,3,4-tetrahydropyrimidin - 6 - yl)-3-ethyl-2-thiourea was added 40 ml. of chloroform to make a slurry. A solution of 2.6 ml. of bromine in 20 ml. of chloroform was poured into the slurry, and the mixture was heated under reflux for 30 minutes. A precipitate formed when the solution cooled to room temperature. A precipitate was collected and washed with carbon tetrachloride. Addition of carbon tetrachloride to the filtrate caused more of the product to precipitate. This solid was also collected and combined with the original precipitate. The combined solids were mixed with water and ammonium hydroxide and sulfur dioxide was bubbled through the mixture to remove hydrogen bromide and bromine. The light yellow solid remaining was collected, M.P. 176–7° C. Recrystallization from methanol produced white needles, M.P. 176–7° C. which on drying weighed 8.5 grams (70.8% of the theoretical). Analysis corresponding to that of 4,6-dimethyl-2-ethylaminothiazolo - [4,5-d] - pyrimidine-5,7-dione.

EXAMPLE IV

Bromine method for synthesis of 4,6-dimethyl-2-n-propylaminothiazolo-[4,5-d]-pyrimidine-5,7-dione To a slurry of 5.1 grams (0.02 mole) of 1-(2,4-diketo-1,3 - dimethyl - 1,2,3,4 - tetrahydropyrimidin - 6 - yl)-3-n-propyl-2-thiourea in 20 ml. of chloroform was added a solution of 1 ml. of bromine in 10 ml. of chloroform. The combination was swirled several times to obtain intimate mixing; it warmed up and the insoluble material dissolved to leave a clear yellow solution. The mixture was now heated under reflux for about 30 minutes. On addition of carbon tetrachloride a solid formed which was collected. The solid was mixed with water, treated with ammonium hydroxide solution and sulfur dioxide passed in and the off-white solid collected and washed thoroughly with water. After drying the off-white material weighed 3.6 grams (70.8% of the theoretical). It had M.P. 124–6° C. and proved to be 4,6-dimethyl-2-n-propylaminothiazolo-[4,5-d]-pyrimidine-5,7-dione.

EXAMPLE V

Peroxide method for synthesis of 2-allylamino-4,6-dimethylthiazolo-[4,5-d]-pyrimidine-5,7-dione To 5.0 grams (0.195 mole) of 1-allyl-3-(2,4-diketo-1,3-dimethyl-1,2,3,4-tetrahydropyrimidin-6-yl) - 2 - thiourea stirred in 100 ml. of glacial acetic acid was added 10 ml. of 30% hydrogen peroxide. After about 5 minutes all of the solid had dissolved although essentially no heat had been produced. On stirring for 5 minutes longer, the solution warmed up. It was then poured into ground ice, and after the ice melted the solid was collected on a filter and washed with water. After drying, the white solid weighed 4.6 grams (corresponding to 91.1% of the theoretical). It had a melting point of 149–50° C. which was not changed on recrystallization from a small quantity of dimethylformamide. When the water-acetic acid filtrate was made alkaline with ammonium hydroxide, 0.2 grams of solid was collected, with M.P. 147–8° C., which gave an ultraviolet pattern similar to that of the main product.

In other runs of the above procedure, the acetic acid and peroxide quantities were cut in half for an equimolar quantity of thiourea without loss in yield.

Other thiazolopyrimidines of the present invention were synthesized according to the procedures of the above examples. The analytical data determined for these compounds are set forth in the following table:

logarithmically graded doses with ten mice at each dose level for each compound and calculating according to the procedure of Miller et al., Proc. Soc'y Exper. Biol. and Med., vol. 57, p. 261 (1944). The lethal dose of the barbiturate which was administered was the $LD_{90-100}$ (the dose required to kill at least 9 of every 10 mice), or 126 mg./kilo of body weight.

TABLE I.—ANALYTICAL DATA ON THIAZOLOPYRIMIDINES

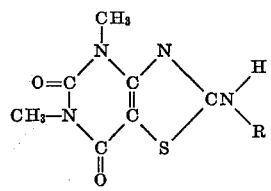

| R equals | Melting point, °C. | Empirical formula | Analysis, percent | | | | | | | |
|---|---|---|---|---|---|---|---|---|---|---|
| | | | Calculated | | | | Found | | | |
| | | | C | H | N | S | C | H | N | S |
| $CH_3$ | 204–5 | $C_8H_{10}N_4O_2S$ | 42.47 | 4.46 | 24.76 | 14.17 | 42.39 | 4.49 | 24.52 | 14.11 |
| $C_2H_5$ | 176–7 | $C_9H_{12}N_4O_2S$ | 44.99 | 5.03 | | 13.34 | 44.98 | 4.86 | | 13.40 |
| Allyl | 149–50 | $C_{10}H_{12}N_4O_2S$ | 47.61 | 4.79 | | 12.71 | 47.48 | 4.77 | | 12.36 |
| $C_3H_7$ | 121–3 | $C_{10}H_{14}N_4O_2S$ | 47.23 | 5.55 | | 12.61 | 46.88 | 5.49 | | 12.45 |
| $C_4H_9$ | 96–8 | $C_{11}H_{16}N_4O_2S$ | 49.24 | 6.01 | | 11.95 | 49.08 | 6.06 | | 11.77 |

The desirable central nervous system anti-depressant properties of the thiazolopyrimidines of this invention are illustrated by the activity of these compounds in protecting mice against lethal doses of pentobarbital sodium (barbiturate antagonist activity). These illustrative results are shown in the following Tables II and III in which the compounds of the present invention are compared with seven reference central nervous system anti-depressants. In this comparison, which is a modification of the procedure reported by Kimura and Richards, Arch. Intern. Pharmacodyn., vol. 110, pp. 29–42 (1957), the ability of the test compound to reverse a lethal dose of barbiturate is determined. The life or death of the test animals following administration of a lethal dose of the barbiturate and then a trial dose of the test compound is used as the end point to provide the values given in the tables as the effective $BAD_{50}$ (median barbiturate antagonist dose). The margin of safety of the test compound is shown by the ratio of the $LD_{50}$ (median lethal dose) to the effective barbiturate antagonist dose.

In this procedure, the $LD_{50}$'s and $BAD_{50}$'s were determined by subjecting the mice to at least three TABLE II
Barbiturate Antagonist Data on Thiazolopyrimidines, mg./kg. in Mice

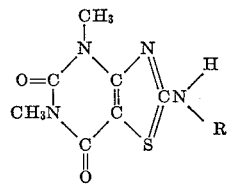

| R equals | $LD_{50}$, i.p. | $BAD_{50}$, i.p. | $LD_{50}/BAD_{50}$ |
|---|---|---|---|
| $CH_3$ | 92 | 8.6 | 10.6 |
| $C_2H_5$ | 27.5 | 9.3 | 2.95 |
| Allyl | 530 | 7.2 | 73.6 |
| $C_3H_7$ | 250 | 17.6 | 14.2 |
| $C_4H_9$ | [1] 285 | 49 | 5.8 |

[1] Three animals tested at each dose.

TABLE III.—REFERENCE CNS ANTI-DEPRESSANTS
[mg./kg. in mice]

| Name | $LD_{50}$, i.p. | $BAD_{50}$, i.p. | $LD_{50}/BAD_{50}$ |
|---|---|---|---|
| Picrotoxin | 9.2 | 4.8 | 1.9 |
| "Megimide" (Bemegride) | 36 | 24 | 1.5 |
| "Metrazol" (pentylenetetrazol) | 90 | 39 | 2.3 |
| "Ritalin" (methylphenidate) | 96.5 | Inactive at 10–150 | |
| "Emivan" (Ethamivan) | 37 | Inactive at 10–200 | |
| Caffeine citrate | 540 | Inactive at 35–500 | |
| Nikethamide | 245 | Inactive at 150–300 | |

From the results shown in the above tables it can be seen that four of the compounds of the present invention are more active than five of the seven reference compounds. Most importantly, the safety margins of five of the novel compounds of the present invention are better than any of the reference compounds and three have safety margins greater than 10.

Various modifications, adaptations and further examples of the present invention can be devised, after reading the foregoing specification and the claims appended hereto, by the person skilled in the art without departing from the spirit and scope of the invention. Thus, it will be apparent that various mutual solvents other than dimethylformamide and dimethylsulfoxide can be used for the reaction of 6-amino-1,3-dimethyluracil with isothiocyanate to prepare the intermediate uracil thioureas employed in the preparation of the novel thiazolopyrimidines of the present invention and various methods of purification of these novel compounds other than recrystallization from methanol or butanol will be apparent to those skilled in the art. So also, the reaction conditions of temperature, time and proportions of reactants can be modified from those illustrated in the specific examples. In the synthesis of the thiazolopyrimidines the reactants are generally reacted in about equimolar equivalents or with an excess of the isothiocyanate, bromine or hydrogen peroxide at reflux temperature. An effective barbiturate antagonist dose of the thiazolopyrimidines can be formulated in any conventional dosage form for administration, including admixtures with many solid and liquid diluents, carriers and adjuvants other than those previously described. These dosages can be administered to revive animals given an overdose of barbiturates, sedatives and hypnotics, such as, for example, pentobarbital sodium, phenobarbital, phenobarbital sodium, chloral hydrate and the like substances. All such variations, modifications and further examples are included within the scope of the invention as defined in the following claim.

What is claimed is:
1. The method of making a thiazolopyrimidine having the formula

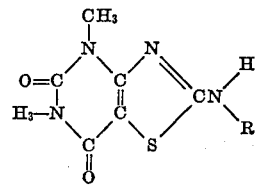

wherein R is selected from the group consisting of lower alkyl having from 1 to 4 carbon atoms and allyl comprising reacting 6-amino-1,3-dimethyluracil with RNCS, wherein R is defined as above, and with dimethylsulfoxide at reflux temperature.

References Cited
UNITED STATES PATENTS
3,660,405   5/1972   Berger et al. _____ 260—256.5 R RICHARD J. GALLAGHER, Primary Examiner U.S. Cl. X.R.
424—251

UNITED STATES PATENT OFFICE
CERTIFICATE OF CORRECTION

Patent No. 3,772,290              Dated   November 13, 1973

Inventor(s)  Arthur Berger and Edeltraut E. Borgaes

It is certified that error appears in the above-identified patent and that said Letters Patent are hereby corrected as shown below:

In claim 1, the structural formula should appear as follows:

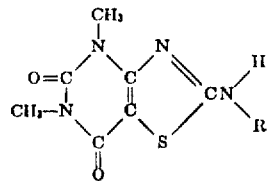

Signed and sealed this 23rd day of April 1974.

(SEAL)
Attest:

EDWARD M.FLETCHER,JR.                C. MARSHALL DANN
Attesting Officer                    Commissioner of Patents